US 10,183,865 B2

(12) United States Patent
Li et al.

(10) Patent No.: US 10,183,865 B2
(45) Date of Patent: Jan. 22, 2019

(54) APPARATUS AND COMBINED PROCESS FOR CARBON DIOXIDE GAS SEPARATION

(71) Applicant: GUANGZHOU INSTITUTE OF ENERGY CONVERSION, CHINESE ACADEMY OF SCIENCES, Guangzhou, Guangdong (CN)

(72) Inventors: Xiaosen Li, Guangzhou (CN); Chungang Xu, Guangzhou (CN); Yisong Yu, Guangzhou (CN); Zhaoyang Chen, Guangzhou (CN); Ningsheng Huang, Guangzhou (CN); Gang Li, Guangzhou (CN)

(73) Assignee: GUANGZHOU INSTITUTE OF ENERGY CONVERSION, CHINESE ACADEMY OF SCIENCES, Guangzhou (CN)

( * ) Notice: Subject to any disclaimer, the term of this patent is extended or adjusted under 35 U.S.C. 154(b) by 111 days.

(21) Appl. No.: 15/487,765

(22) Filed: Apr. 14, 2017

(65) Prior Publication Data
US 2018/0148331 A1     May 31, 2018

(30) Foreign Application Priority Data
Nov. 25, 2016    (CN) .......................... 2016 1 1052184

(51) Int. Cl.
*B01D 53/14* (2006.01)
*C01B 3/02* (2006.01)
*C01B 3/52* (2006.01)

(52) U.S. Cl.
CPC ............ *C01B 3/52* (2013.01); *B01D 53/1418* (2013.01); *B01D 53/1425* (2013.01);
(Continued)

(58) Field of Classification Search
CPC ............ B01D 53/1418; B01D 53/1425; B01D 53/1475; B01D 53/1493;
(Continued)

(56) References Cited

U.S. PATENT DOCUMENTS

| 6,352,576 B1* | 3/2002 | Spencer | B01D 53/1475 423/220 |
| 2007/0248527 A1* | 10/2007 | Spencer | B01D 53/1475 423/437.1 |
| 2010/0021361 A1* | 1/2010 | Spencer | B01D 53/62 423/220 |

FOREIGN PATENT DOCUMENTS

| CN | 103638800 A | 3/2014 |
| CN | 103961989 A | 8/2014 |

OTHER PUBLICATIONS

Chen, "Study on $CO_2$ Capture Technology Based on IGCC Power Generation System", Master Dissertation, Mar. 2014, pp. 1-64, w/English Abstract. (75 pages).

(Continued)

*Primary Examiner* — Frank M Lawrence, Jr.
(74) *Attorney, Agent, or Firm* — Westerman, Hattori, Daniels & Adrian, LLP

(57) ABSTRACT

An apparatus and a combined process for carbon dioxide gas separation, combining the hydrate-based process with the chemical absorption process, which reduces secondary pollution and allows the efficient continuous separation of carbon dioxide gas without increasing the pressure and thereby the operating cost is reduced significantly. The apparatus and combined process can be applied in the separation of carbon dioxide in IGCC synthetic gas, natural gas and biogas, and address the issues of the existing processes such as high energy consumption, low throughput, and secondary pollution.

7 Claims, 2 Drawing Sheets

(52) U.S. Cl.
CPC ..... B01D 53/1475 (2013.01); B01D 53/1493 (2013.01); C01B 3/02 (2013.01); *B01D 2252/20405* (2013.01); *B01D 2252/20421* (2013.01); *B01D 2252/20431* (2013.01); *B01D 2252/20484* (2013.01); *B01D 2252/20489* (2013.01); *C01B 2203/0415* (2013.01); *C01B 2203/0475* (2013.01); *Y02C 10/04* (2013.01); *Y02P 20/152* (2015.11)

(58) Field of Classification Search
CPC ........... B01D 2252/20405; B01D 2252/20421; B01D 2252/20431; B01D 2252/20484; B01D 2252/20489; Y02C 10/04; Y02P 20/152
USPC ..... 95/159, 236; 96/243; 423/220, 226, 228, 423/229
See application file for complete search history.

(56) References Cited

OTHER PUBLICATIONS

Zhang, "Adsorptive Separation of Carbon Dioxide", Master Dissertation, Jun. 2014, pp. 1-155, w/English Abstract. (165 pages).

* cited by examiner

APPARATUS AND COMBINED PROCESS FOR CARBON DIOXIDE GAS SEPARATION

FIELD OF THE INVENTION

The present invention relates to the field of hydrate formation and utilization, and particularly to an apparatus and a combined process for carbon dioxide gas separation.

BACKGROUND OF THE INVENTION

Excessive emission of carbon dioxide caused by the combustion of fossil fuels has been considered as the primary cause of global warming, about ⅓ of which is from power plants emission. Thus the separation and capture of the carbon dioxide from power plants has become a priority in emission reduction all over the world. At present, there are three leading approaches for separating carbon dioxide, i.e., pre-combustion capture, post-combustion capture, and oxygen-rich combustion capture. The pre-combustion capture has been considered to be a promising approach for decarbonization, and IGCC (Integrated Gasification Combined Cycle) process is considered to be an effective approach for pre-combustion capture.

The synthetic gas produced by IGCC process is a mixture of carbon dioxide and hydrogen wherein the carbon dioxide accounts for 20%-40% of the mixture, and has an outlet pressure of 2-5 MPa. By removing the carbon dioxide within it, the IGCC synthetic gas only produces water as combustion product which does no harm to the environment, making it a clean energy. Thus, the separation and capture of carbon dioxide has become the key of the technology.

At present, methods for separating and capturing carbon dioxide in IGCC synthetic gas mainly include cryogenic separation process, chemical absorption process, membrane absorption process, and combined physical and chemical absorption process. Chen has made a research on the chemical absorption process and presented a systematic evaluation (*Study on $CO_2$ Capture Technology Based on IGCC Power Generation Systems*, 2014). Zhang has presented a systematic review on the current carbon dioxide capture processes, focusing on the influence of the adsorbent on the adsorption of carbon dioxide (*Adsorptive Separation of Carbon Dioxide*, 2012). The above mention methods have been proofed to be efficient in practice, but problems exist, such as high operating cost, secondary pollution, and the underdevelopment of supporting technologies. Li et al has disclosed a hydrate-based process for separating carbon dioxide which is considered to be low-cost and non-pollution (Chinese patent publication No. CN103638800A). Song et al has disclosed an apparatus for the hydrate-based separation (Chinese patent publication No. CN103961989A). Compared with the traditional methods, apparatuses for separating and capturing carbon dioxide using hydrate-based method present advantages, but challenges in commercialization exist such as low hydrate formation rate, and incapability of continuous production; furthermore, while the efficiency of primary separation is low, multi-stage separation has a challenge in commercialization that, as the concentration of the carbon dioxide is reduced in each stage, the required pressure for hydrate formation will rise dramatically in the subsequent stage.

SUMMARY OF THE INVENTION

In view of the above concerns, the present invention provides an apparatus and a combined process for carbon dioxide gas separation, combining the hydrate-based process with the chemical absorption process, which reduces secondary pollution and allows the efficient continuous separation of carbon dioxide gas without increasing the pressure and thereby the operating cost is reduced significantly. The present invention can be applied in the separation of carbon dioxide in IGCC synthetic gas, natural gas and biogas, and address the issues of the existing processes such as high energy consumption, low throughput, and secondary pollution.

According to one aspect of the present invention, an apparatus for carbon dioxide gas separation combining the hydrate-based process with the chemical absorption process is provided.

The apparatus comprises a gas source, a flow distributor, a gas flow meter, a venturi jet unit provided with two liquid inhaling inlets, a tubular hydrate reaction unit, a gas-liquid-solid three-phase separation unit, a first slurry pump, a hydrate dissociation unit provided with a first pressure maintaining valve at its top, a second slurry pump, and a solution saturation tank provided with a third safety valve at its top which are communicated sequentially.

Besides, the apparatus further comprises a chemical absorption tower, a second corrosion-resistant pump, a heat exchanger, a regeneration tower, a third corrosion-resistant pump, and a reservoir containing a $CO_2$ chemical absorbent, which are communicated sequentially.

The reservoir is communicated with an upper portion of the chemical absorption tower through a first corrosion-resistant pump to form a cycle.

The flow distributor is communicated with a bottom inlet of the solution saturation tank, and a bottom outlet of the solution saturation tank is communicated with the two liquid inhaling inlets of the venturi jet unit through sequentially a liquid-phase mass flow meter and a ninth stop valve.

A second safety valve is disposed at a top of the gas-liquid-solid three-phase separation unit; the gas-liquid-solid three-phase separation unit is communicated with a lower portion of the chemical absorption tower through sequentially a third one-way gas valve, a second pressure maintaining valve and a fourth one-way gas valve.

An upper portion of the chemical absorption tower is communicated with a hydrogen collecting tank provided with a first safety valve through a fifth one-way gas valve.

The regeneration tower is further communicated with the hydrate dissociation unit, wherein regenerated carbon dioxide gas is directed to the hydrate dissociation unit in which it will be mixed with the carbon dioxide produced during the dissociation and then subjected to a subsequent processing.

Particularly, the venturi jet unit comprises sequentially a body section, a convergent section, a throat section and a divergent section between its inlet and outlet; the body section has a length of 250 mm, and a inner diameter identical with a inner diameter of the tubular hydrate reaction unit; a distance between the narrowest portion of the throat section and an outlet of the divergent section is 80~100 mm.

One of the two liquid inhaling inlets of the venturi jet unit is disposed between the narrowest portion of the throat section and the inlet of the venturi jet unit at a position 30~50 mm away from the narrowest portion of the throat section, and communicated with the ninth stop valve.

The other one of the two liquid inhaling inlets is disposed at the narrowest portion of the throat section, and communicated with the ninth stop valve through a ball valve.

A Laval nozzle with a length of 100~120 mm is disposed at a inlet of the body section of the venturi jet unit; the Laval nozzle has a large opening with a maximum outer diameter identical with the inner diameter of the tubular hydrate reaction unit, and an small opening with a maximum diameter equal to ½ of the diameter of the large opening; a diameter of the narrowest portion of the Laval nozzle is ⅙ of the diameter of the large opening.

The tubular hydrate reaction unit comprises three straight pipe sections and two bent pipes; temperature sensors and pressure sensors are disposed on each straight pipe section; the tubular hydrate reaction unit and the solution saturation tank are respectively provided with an external water-cooled jacket, and the temperature of the tubular hydrate reaction unit and the solution saturation tank is controlled by an external cooling machine.

The gas source and the flow distributor are communicated through a first one-way gas valve; the gas-liquid-solid three-phase separation unit, the first slurry pump, the hydrate dissociation unit, the second slurry pump, and the solution saturation tank, are sequentially communicated through a first stop valve, a second stop valve, a third stop valve and a fourth stop valve; the heat exchanger, the regeneration tower and the third corrosion-resistant pump are sequentially communicated through a seventh stop valve and an eighth stop valve; the reservoir, the first corrosion-resistant pump and the chemical absorption tower are sequentially communicated through a sixth stop valve and a fifth stop valve; the flow distributor and the bottom inlet of the solution saturation tank are communicated through a tenth stop valve.

The present invention further provides a combined process for carbon dioxide gas separation combining the hydrate-based process with the chemical absorption process, using the above apparatus, and comprising the following steps:

(1): a IGCC synthetic gas is distributed into two flows via the flow distributor; one flow is directed to the solution saturation tank to sparge a solution containing an hydrate promoter for pre-saturation by bottom-sparging and maintain a pressure of 3-5 MPa in the solution saturation tank; the other flow is directed to the venturi jet unit; the saturated solution in the solution saturation tank is directed to the venturi jet unit and atomized by being sprayed and mixed with the IGCC synthetic gas flow; the atomized solution is then directed to the tubular hydrate reaction unit to form a hydrate slurry; a temperature of 0-10° C. and a pressure of 3-6 MPa are maintained in the tubular hydrate reaction unit and the solution saturation tank respectively;

(2): the hydrate slurry formed in the step (1) is directed from the tubular hydrate reaction unit to the gas-liquid-solid three-phase separation unit in which a gas is separated from the hydrate slurry; the hydrate slurry flows out from a lower portion of the gas-liquid-solid three-phase separation unit, and is directed to the hydrate dissociation unit via the first slurry pump; after dissociation, an obtained carbon dioxide is discharged via the first pressure maintaining valve for subsequent processing, and obtained water is directed via the second slurry pump to the solution saturation tank for reuse; the gas separated in the gas-liquid-solid three-phase separation unit, in which a molar ratio of carbon dioxide is ranged from 6% to 17%, is directed to the lower portion of the chemical absorption tower via the second pressure maintaining valve, contacted with the $CO_2$ chemical absorbent which is directed from the reservoir to the chemical absorption tower to remove carbon dioxide, and then directed from the upper portion of the chemical absorption tower to the hydrogen collecting tank in which hydrogen with a purity of 95%-99% is collected; the $CO_2$ chemical absorbent, which has absorbed carbon dioxide, is directed through a second corrosion-resistant pump to the heat exchanger for heat exchanging and then directed to the regeneration tower in which the $CO_2$ chemical absorbent is regenerated by gas stripping at 100-150° C. to obtain a regenerated carbon dioxide and a regenerated chemical absorbent; the regenerated carbon dioxide is directed to the hydrate dissociation unit and mixed with the carbon dioxide obtained from the dissociation for subsequent processing; the regenerated chemical absorbent is directed through the third corrosion-resistant pump to the reservoir for reuse.

The hydrate promoter is selected from one or more of tetrahydrofuran (THF), tetrabutylammonium bromide (TBAB) and cyclopentane.

The $CO_2$ chemical absorbent is ethanolamine (MEA) or N-methyldiethanolamine (MDEA).

The present invention has the following advantages:

(1) Since the IGCC synthetic gas has a high outlet concentration of carbon dioxide (40% $CO_2$/60% $H_2$), most of the carbon dioxide in the synthetic gas can be separated by hydrate-based separation process under the outlet pressure (2-5 MPa) without additional pressurization. As the concentration of carbon dioxide in the remaining synthetic gas is relatively low (10% $CO_2$/90% $H_2$), pressurization which will significantly increase the cost is required for hydrate-based separation. Thus, chemical absorption process is introduced to remove the remaining carbon dioxide and obtain high-purity hydrogen (>98%), by which the continuous separation of carbon dioxide and the purification of hydrogen are achieved.

(2) With the aid of the venturi jet unit by atomizing the solution, the hydrate formation in the tubular hydrate reaction unit is enhanced so that the formation time is reduced and thereby the required length of the tubular hydrate reaction unit.

(3) In view of the low separation efficiency of the hydrate-based separation process when the concentration of carbon dioxide is low, the chemical absorption process is introduced to make up such defect. Almost all the carbon dioxide in the synthetic gas can be removed in one process, which promises a greatly increased efficiency and throughput.

(4) The tubular hydrate reaction unit allows the continuous separation of the hydrate. The tubular hydrate reaction unit further allows the rapid and efficient hydrate formation, for it has a better heat and mass transfer effect.

In summary, the present invention allows efficient continuous separation of carbon dioxide without pressurization and thereby the cost is reduced and the secondary pollution is alleviated. The present invention can be applied in the separation of carbon dioxide in IGCC synthetic gas, natural gas and biogas, and address the issues of the existing processes such as high energy consumption, low throughput, and secondary pollution.

Reference numbers: 1: first one-way gas valve; 2: flow distributor; 3: gas flow meter; 4: second one-way gas valve; 5: venturi jet unit; 6, 8, 10, 12, 14, 16, 18, 20 and 22: temperature sensors; 7, 9, 11, 13, 15, 17, 19, 21 and 23: pressure sensors; 24: gas-liquid-solid three-phase separation unit; 25: first stop valve; 26: first slurry pump; 27: second stop valve; 28: hydrate dissociation unit; 29: first pressure maintaining valve; 30: third stop valve; 31: second slurry pump; 32: fourth stop valve; 33: solution saturation tank; 34: third one-way gas valve; 35: second pressure maintaining valve; 36: fourth one-way gas valve; 37: chemical absorption tower; 38: fifth one-way gas valve; 39: hydrogen collecting tank; 40: fifth stop valve; 41: first corrosion-resistant pump; 42: sixth stop valve; 43: reservoir; 44: second corrosion-resistant pump; 45: heat exchanger; 46: seventh stop valve; 47: regeneration tower; 48: eight stop valve; 49: third corrosion-resistant pump; 50: ninth stop valve; 51: tenth stop valve; 52: liquid-phase mass flow meter; 53: first safety valve; 54: second safety valve; 55: third safety valve; 56: body section of the venturi jet unit; 57: Laval nozzle; 58: ball valve.

DETAILED DESCRIPTION OF THE EMBODIMENTS

The following embodiments are used for further describing this invention rather than limiting the invention.

Figure 1:
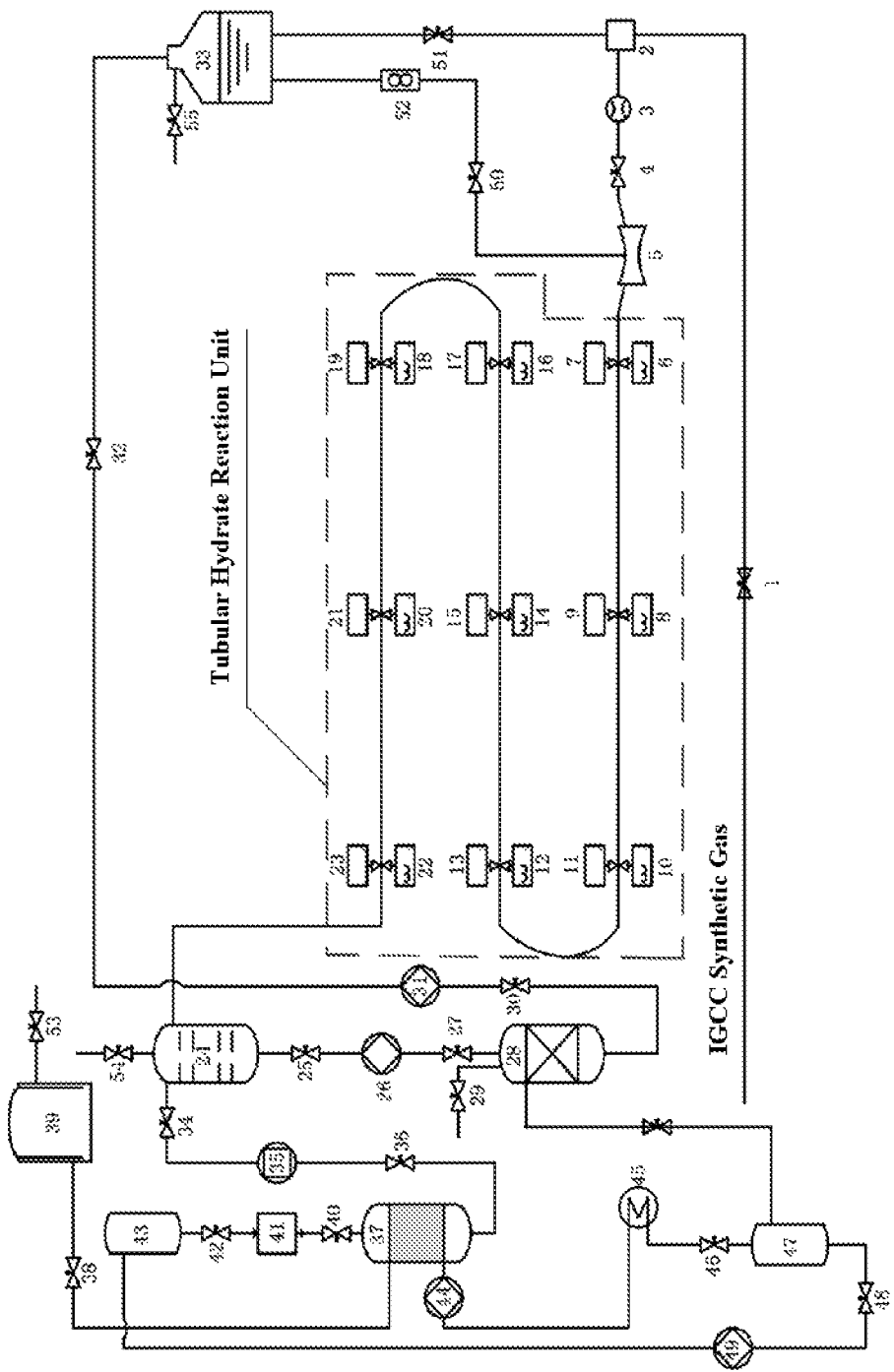
FIG. 1 shows a structural diagram of an apparatus of the present invention.

As shown in FIG. 1, the apparatus comprises a gas source, a first on-way gas valve 1, a flow distributor 2, a gas flow meter 3, a second one-way gas valve 4, a venturi jet unit 5 provided with two liquid inhaling inlets, a tubular hydrate reaction unit, a gas-liquid-solid three-phase separation unit 24, a first stop valve 25, a first slurry pump 26, a second stop valve 27, a hydrate dissociation unit 28 provided with a first pressure maintaining valve 29 at its top, a third stop valve 30, a second slurry pump 31, a fourth stop valve 32, and a solution saturation tank 33 provided with a third safety valve 55 at its top which are communicated sequentially.

Besides, the apparatus further comprises a chemical absorption tower 37, a second corrosion-resistant pump 44, a heat exchanger 45, a seventh stop valve 46, a regeneration tower 47, an eighth stop valve 48, a third corrosion-resistant pump 49, and a reservoir 43 containing a $CO_2$ chemical absorbent, which are communicated sequentially.

The reservoir 43 is communicated with an upper portion of the chemical absorption tower 37 through a sixth stop valve 42, a first corrosion-resistant pump 41 and a fifth stop valve 40 sequentially, to form a cycle.

The flow distributor 2 is communicated with a bottom inlet of the solution saturation tank 33 through a tenth stop valve 51, and a bottom outlet of the solution saturation tank 33 is communicated with the two liquid inhaling inlets of the venturi jet unit 5 through sequentially a liquid-phase mass flow meter 52 and a ninth stop valve 50.

A second safety valve 54 is disposed at a top of the gas-liquid-solid three-phase separation unit 24; the gas-liquid-solid three-phase separation unit 24 is communicated with a lower portion of the chemical absorption tower 27 through sequentially a third one-way gas valve 34, a second pressure maintaining valve 35 and a fourth one-way gas valve 36.

An upper portion of the chemical absorption tower 37 is communicated with a hydrogen collecting tank 39 provided with a first safety valve 53 through a fifth one-way gas valve 38.

The regeneration tower 47 is further communicated with the hydrate dissociation unit 28, wherein regenerated carbon dioxide gas is directed to the hydrate dissociation unit 28 in which it will be mixed with the carbon dioxide produced during the dissociation and then subjected to a subsequent processing.

Figure 2:
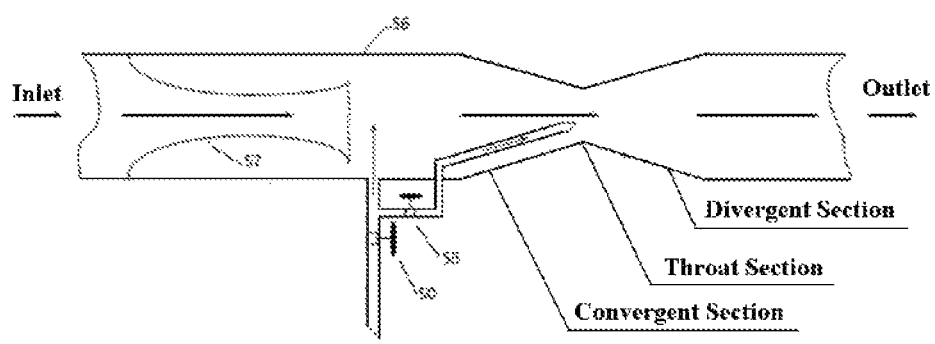
FIG. 2 shows a structural diagram of the venturi jet unit in FIG. 1.

Particularly, as shown in FIG. 2, the venturi jet unit 5 comprises sequentially a body section 56, a convergent section, a throat section and a divergent section between its inlet and outlet; the body section 56 has a length of 250 mm, and a inner diameter identical with a inner diameter of the tubular hydrate reaction unit; a distance between the narrowest portion of the throat section and an outlet of the divergent section is 80~100 mm.

One of the two liquid inhaling inlets of the venturi jet unit is disposed between the narrowest portion of the throat section and the inlet of the venturi jet unit at a position 30~50 mm away from the narrowest portion of the throat section, and communicated with the ninth stop valve 50.

The other one of the two liquid inhaling inlets is disposed at the narrowest portion of the throat section, and communicated with the ninth stop valve 50 through a ball valve 58.

A Laval nozzle 57 with a length of 100~120 mm is disposed at a inlet of the body section of the venturi jet unit; the Laval nozzle 57 has a large opening with a maximum outer diameter identical with the inner diameter of the tubular hydrate reaction unit, and an small opening with a maximum diameter equal to ½ of the diameter of the large opening; a diameter of the narrowest portion of the Laval nozzle is ⅙ of the diameter of the large opening.

The tubular hydrate reaction unit comprises three straight pipe sections and two bent pipes, which are able to withstand a pressure up to 10 MPa, and the inner diameter is 2-4 cm; temperature sensors 6, 8, 10, 12, 14, 16, 18, 20 and 22, and pressure sensors 7, 9, 11, 13, 15, 17, 19, 21 and 23, are disposed on each straight pipe section. The tubular hydrate reaction unit and the solution saturation tank 33 are respectively provided with an external water-cooled jacket, and the temperature of the tubular hydrate reaction unit and the solution saturation tank is controlled by an external cooling machine.

The combined process for carbon dioxide gas separation combining the hydrate-based process with the chemical absorption process, using the above apparatus, comprises the following steps:

(1): a IGCC synthetic gas is directed to the flow distributor 2 through the first one-way valve 1, and distributed into two flows via the flow distributor 2; one flow is directed through the tenth stop valve 51 to the solution saturation tank 33 (with a volume of 150-200 L) to sparge a solution containing an hydrate promoter for pre-saturation by bottom-sparging and maintain a pressure of 3-5 MPa in the solution saturation tank 33; the other flow is directed to the gas flow meter 3 and metered, the metered flow is then directed to the venturi jet unit 5 through the second one-way gas valve 4; the saturated solution in the solution saturation tank 33 is directed to the liquid-phase mass flow meter 52 and metered, the metered solution is then directed to the venturi jet unit 5 through the ninth stop valve 50, and atomized by being sprayed and mixed with the IGCC synthetic gas flow; the atomized solution is then directed to the tubular hydrate reaction unit to form a hydrate slurry; a temperature of 0-10° C. and a pressure of 3-6 MPa are maintained in the tubular hydrate reaction unit and the solution saturation tank 33 respectively;

(2): the hydrate slurry formed in the step (1) is directed from the tubular hydrate reaction unit to the gas-liquid-solid three-phase separation unit 24 in which a gas is separated from the hydrate slurry; the hydrate slurry then flows out from a lower portion of the gas-liquid-solid three-phase separation unit 24, and is directed to the hydrate dissociation unit 28 through the first stop valve 25, the first slurry pump 26 and the second stop valve 27; after dissociation, an obtained carbon dioxide is discharged via the first pressure maintaining valve 29 for subsequent processing, and obtained water is directed through the third stop valve 30 the second slurry pump 31 and the fourth stop valve 32 to the solution saturation tank 33 for reuse.

After separated from the hydrate slurry, the remaining gas separated in the gas-liquid-solid three-phase separation unit has a molar ratio of carbon dioxide ranged from 6% to 17%, which required a high pressure for hydrate formation and thereby it is not worthy to further separate the carbon dioxide by hydrate-based separation. In order to obtain high purity hydrogen gas, the remaining gas is directed to the lower portion of the chemical absorption tower through the third one-way gas valve 34, the second pressure maintaining valve 35 and the fourth one-way gas valve 36 sequentially. And then the remaining gas is contacted with the $CO_2$ chemical absorbent (MEA or MDEA), which is directed from the reservoir 43 to the chemical absorption tower 37 through sequentially the sixth stop valve 42, the first corrosion-resistant pump 41, and the fifth stop valve 40, to remove carbon dioxide, and then directed from the upper portion of the chemical absorption tower 37 through the fifth one-way gas valve 38 to the hydrogen collecting tank 39 in which hydrogen with a purity of 95%-99% is collected; the $CO_2$ chemical absorbent, which has absorbed carbon dioxide, is directed through a second corrosion-resistant pump 44 to the heat exchanger 45 for heat exchanging and then directed to the regeneration tower 47 in which the $CO_2$ chemical absorbent is regenerated by gas stripping at 100-150° C. to obtain a regenerated carbon dioxide and a regenerated chemical absorbent; the regenerated carbon dioxide is directed to the hydrate dissociation unit 28 and mixed with the carbon dioxide obtained from the dissociation for subsequent processing; the regenerated chemical absorbent is directed through the eight stop valve 48, the third corrosion-resistant pump 49 to the reservoir 43 for reuse.

The hydrate promoter is selected from one or more of tetrahydrofuran (THF), tetrabutylammonium bromide (TBAB) and cyclopentane.

The invention claimed is:

1. An apparatus for carbon dioxide gas separation, comprising a gas source, a flow distributor, a gas flow meter, a venturi jet unit provided with two liquid inhaling inlets, a tubular hydrate reaction unit, a gas-liquid-solid three-phase separation unit, a first slurry pump, a hydrate dissociation unit provided with a first pressure maintaining valve at its top, a second slurry pump, and a solution saturation tank provided with a third safety valve at its top, which are communicated sequentially, further comprising a chemical absorption tower, a second corrosion-resistant pump, a heat exchanger, a regeneration tower, a third corrosion-resistant pump, and a reservoir containing a $CO_2$ chemical absorbent, which are communicated sequentially, wherein,
the reservoir is communicated with an upper portion of the chemical absorption tower through a first corrosion-resistant pump to form a cycle;
the flow distributor is communicated with a bottom inlet of the solution saturation tank, and a bottom outlet of the solution saturation tank is communicated with the two liquid inhaling inlets of the venturi jet unit through sequentially a liquid-phase mass flow meter and a ninth stop valve;
a second safety valve is disposed at a top of the gas-liquid-solid three-phase separation unit;
the gas-liquid-solid three-phase separation unit is communicated with a lower portion of the chemical absorption tower through sequentially a third one-way gas valve, a second pressure maintaining valve and a fourth one-way gas valve;
an upper portion of the chemical absorption tower is communicated with a hydrogen collecting tank provided with a first safety valve through a fifth one-way gas valve;
the regeneration tower is further communicated with the hydrate dissociation unit, and regenerated carbon dioxide gas is directed to the hydrate dissociation unit in which it will be mixed with the carbon dioxide produced during the dissociation and then subjected to a subsequent processing.

2. The apparatus according to claim 1, wherein the venturi jet unit comprises sequentially a body section, a convergent section, a throat section and a divergent section between its inlet and outlet; the body section has a length of 250 mm, and a inner diameter identical with a inner diameter of the tubular hydrate reaction unit; a distance between the narrowest portion of the throat section and an outlet of the divergent section is 80~100 mm;
one of the two liquid inhaling inlets of the venturi jet unit is disposed between the narrowest portion of the throat section and the inlet of the venturi jet unit at a position 30~50 mm away from the narrowest portion of the throat section, and communicated with the ninth stop valve; the other one of the two liquid inhaling inlets is disposed at the narrowest portion of the throat section, and communicated with the ninth stop valve through a ball valve;
a Laval nozzle with a length of 100~120 mm is disposed at a inlet of the body section of the venturi jet unit; the Laval nozzle has a large opening with a maximum outer diameter identical with the inner diameter of the tubular hydrate reaction unit, and an small opening with a maximum diameter equal to ½ of the diameter of the large opening; a diameter of the narrowest portion of the Laval nozzle is ⅙ of the diameter of the large opening.

3. The apparatus according to claim 1, wherein the tubular hydrate reaction unit comprises three straight pipe sections and two bent pipes; temperature sensors and pressure sensors are disposed on each straight pipe section; the tubular hydrate reaction unit and the solution saturation tank are respectively provided with an external water-cooled jacket, and the temperature of the tubular hydrate reaction unit and the solution saturation tank is controlled by an external cooling machine.

4. The apparatus according to claim 1, wherein the gas source and the flow distributor are communicated through a first one-way gas valve; the gas-liquid-solid three-phase separation unit, the first slurry pump, the hydrate dissociation unit, the second slurry pump, and the solution saturation tank, are sequentially communicated through a first stop valve, a second stop valve, a third stop valve and a fourth stop valve; the heat exchanger, the regeneration tower and the third corrosion-resistant pump are sequentially communicated through a seventh stop valve and an eighth stop valve; the reservoir, the first corrosion-resistant pump and the chemical absorption tower are sequentially communicated through a sixth stop valve and a fifth stop valve; the flow distributor and the bottom inlet of the solution saturation tank are communicated through a tenth stop valve.

5. A combined process for carbon dioxide gas separation using the apparatus according to claim 1, comprising the following steps:
(1): distributing a IGCC synthetic gas into two flows via the flow distributor; wherein one flow is directed to the solution saturation tank to sparge a solution containing an hydrate promoter for pre-saturation by bottom-sparging and maintaining a pressure of 3-5 MPa in the solution saturation tank; wherein the other flow is directed to the venturi jet unit; directing the saturated solution in the solution saturation tank to the venturi jet unit and atomizing the saturated solution by spraying and mixing with the IGCC synthetic gas flow; then directing the atomized solution to the tubular hydrate reaction unit to form a hydrate slurry; a temperature of 0-10° C. and a pressure of 3-6 MPa are maintained in the tubular hydrate reaction unit and the solution saturation tank respectively;

(2): directing the hydrate slurry formed in the step (1) from the tubular hydrate reaction unit to the gas-liquid-solid three-phase separation unit in which a gas is separated from the hydrate slurry; flowing the hydrate slurry out from a lower portion of the gas-liquid-solid three-phase separation unit, and directing the hydrate slurry to the hydrate dissociation unit via the first slurry pump; after dissociation, discharging an obtained carbon dioxide via the first pressure maintaining valve for subsequent processing, and directing obtained water via the second slurry pump to the solution saturation tank for reuse; directing the gas separated in the gas-liquid-solid three-phase separation unit, in which a molar ratio of carbon dioxide is ranged from 6% to 17%, to the lower portion of the chemical absorption tower via the second pressure maintaining valve, removing carbon dioxide by contacting with the $CO_2$ chemical absorbent which is directed from the reservoir to the chemical absorption tower, and then directing from the upper portion of the chemical absorption tower to the hydrogen collecting tank in which hydrogen with a purity of 95%-99% is collected; directing the $CO_2$ chemical absorbent, which has absorbed carbon dioxide, through a second corrosion-resistant pump to the heat exchanger for heat exchanging and then directing to the regeneration tower in which the $CO_2$ chemical absorbent is regenerated by gas stripping at 100-150° C. to obtain a regenerated carbon dioxide and a regenerated chemical absorbent; directing the regenerated carbon dioxide to the hydrate dissociation unit and mixing with the carbon dioxide obtained from the dissociation for subsequent processing; directing the regenerated chemical absorbent through the third corrosion-resistant pump to the reservoir for reuse.

6. The combined process according to claim 5, wherein the hydrate promoter is selected from one or more of tetrahydrofuran, tetrabutylammonium bromide and cyclopentane.

7. The combined process according to claim 6, wherein the $CO_2$ chemical absorbent is ethanolamine or N-methyldiethanolamine.

* * * * *